United States Patent [19]
Clippard, III

[11] 3,786,831
[45] Jan. 22, 1974

[54] VALVE WITH MODULAR MANIFOLD BODY

[75] Inventor: Wm. L. Clippard, III, Cincinnati, Ohio

[73] Assignee: Clippard Instrument Laboratory, Inc., Cincinnati, Ohio

[22] Filed: Apr. 5, 1973

[21] Appl. No.: 348,303

Related U.S. Application Data

[62] Division of Ser. No. 206,636, Dec. 10, 1971.

[52] U.S. Cl. .................................. 137/269, 137/833
[51] Int. Cl. ......................... F16k 11/00, F15c 1/06
[58] Field of Search ... 137/269, 271, 561, 833, 315, 137/608; 251/367

[56] References Cited
UNITED STATES PATENTS

| | | | |
|---|---|---|---|
| 2,838,059 | 6/1958 | Biagi et al. ...................... | 137/269 X |
| 2,941,546 | 6/1960 | Cowherd........................ | 137/625.11 |
| 3,020,927 | 2/1962 | McLaughlin................... | 251/367 X |
| 3,323,547 | 6/1967 | Van Husen, Jr. et al. ...... | 137/269 X |
| 3,384,122 | 5/1968 | Harpman....................... | 251/367 X |
| 3,487,848 | 1/1970 | Leibfritz et al. ............... | 137/271 |
| 3,503,414 | 3/1970 | Schnellmann.................. | 137/269 |
| 3,528,445 | 9/1970 | Shinn et al..................... | 137/833 |
| 3,589,387 | 6/1971 | Raymond....................... | 137/271 |
| 3,712,320 | 1/1973 | Jansen ........................... | 137/608 X |
| 3,731,700 | 5/1973 | Cohen............................. | 137/833 |

*Primary Examiner*—William R. Cline
*Attorney, Agent, or Firm*—Richard H. Evans

[57] ABSTRACT

A valve having a modular, multi-passage manifold or body. Different types of valve mechanisms are insertable axially through an open end of a cavity formed within the manifold and are sealed therein by a closure. Fluid connections for the valve mechanism are provided by a plurality of passages which extend parallel to the cavity but within the wall of the manifold, from a common end of the manifold. Each passage extends longitudinally in the manifold parallel to the cavity over substantially all of the effective length of the cavity, and is selectively ported to the cavity at one or more positions along its length to serve the particular valve mechanism with which the manifold is used. The valve mechanism has circumferential grooves with which the respective manifold cavity ports communicate.

16 Claims, 11 Drawing Figures

VALVE WITH MODULAR MANIFOLD BODY

This is a division of application Ser. No. 206,636, filed Dec. 10, 1971.

This invention relates to a valve construction having a standardized, quick mount valve manifold or body. The invention is especially useful with miniature fluid power and logic control valves, and for that reason it is explained herein primarily in relation to such valves, although its utility is not limited to them. By "miniature" is meant pneumatic or hydraulic valves which have flow passages of about ⅛ inch diameter, or less.

Such miniature valves are widely used, for example, for animated displays, automated production equipment, bread board test fixtures, control circuits, fluidic circuitry, high pressure lubrication, instrumentation, jigs and fixtures, laboratory equipment, life test equipment, packaging machinery, pneumatic gauging and sensing devices.

Many fluid power circuits and control circuits include a large number of miniature valves; the circuit may include one hundred or more such valves. From time to time need arises to replace a valve in such a bank or circuit, so that ease of installation and replacement is important. For this purpose it is known to mount such valves by plug-in type couplings, somewhat in the manner that vacuum tubes and electrical relays are mounted. Modularized or plug-in mounting structure for such valves is shown in U.S. Pat. Nos. 2,711,754; 2,730,379; 2,941,546; 3,407,833; 3,407,834; and 3,548,859.

To satisfy the needs of various circuits, the manufacturer of a line of miniature valves must provide a wide range of valve types or functions. These include but are not limited to two, three and four-way valves, needle valves, check valves, shuttle valves, flow control valves, pressure regulators, quick exhaust valves, and pulse valves. In the past, each different type of valve has generally required a different valve body, with the valve body size, configuration and internal passages differing from type to type, and with non-standard port locations.

External conduit connection points have differed from valve to valve, with some external lines being connected to the valve through openings in the sidewall, and others at the ends of the body, so that standardized or bank mounting for valves of several different types has been difficult or complex. This has made the mountings less compact than desirable, and has complicated both installation and replacement of valves when necessary.

The present invention is directed to a valve construction based upon a common or standardized manifold or valve body which can accept and be used with a variety of different valve mechanisms that will provide different valve functions including all of those mentioned above. A cleaner, more compact valve and mounting for it is provided, and manufacturing economies are achieved.

BRIEF DESCRIPTION OF THE INVENTION

The invention provides a fluid supply manifold in the form of a hollow body having a generally annular wall portion surrounding an internal cavity which is closed at one end and open at the other. A plurality of fluid passages extend longitudinally within the manifold wall, and spaced between the cavity surface and the outside surface. These passages run parallel to the cavity for substantially its full length but, as initially formed, do not enter or connect to the cavity at any point. They extend to and open through the closed end of the manifold at spaced positions around the axis of the cavity, and their outlets are mateable with standardized porting provided in a base.

To adapt the manifold for use with a particular type of valve mechanism that is to be installed within the manifold cavity, internal porting is provided by ports formed in the radial direction, that is, between the internal cavity and one or more of the longitudinal manifold passages. As will be explained, each such port is preferably formed by a milled slot made from the internal cavity to the passage, but not extending to the outside surface of the manifold.

It is the function of the manifold to receive and mount the particular type of valve mechanism which is required, and to provide standardized passage means for conveying fluid to and from that mechanism. The open end of the manifold cavity is closed by a cap or other closure which seals the valve mechanism in the cavity and holds the valve against axial movement as an entity within the cavity.

Whatever the specific nature of the valving function provided by the valve mechanism that is to be disposed in the manifold cavity, it includes an outer part which is dimensioned to be received in the manifold cavity and which has a plurality of longitudinally spaced peripheral grooves around its outside surface that communicate with the manifold cavity ports for the flow of fluid into and out of the mechanism.

The valve mechanism may include one or more movable inner elements such as a poppet or spool which is slidable or shiftable relative to and within the grooved or outer portion. The grooves of the outer portion are ported to the movable element such that fluid supplied from the manifold to the outer valve portion via a peripheral groove thereon, is directed internally to the movable element. The valve mechanism has a maximum outside diameter that corresponds to the diameter of the cavity so that the mechanism is insertable and removable from the cavity through the open end thereof, when the closure is not in place.

It is recognized that the prior art teaches the forming of longitudinal passages in a valve body in which a grooved spool or internal element is movable, as shown in U.S. Pat. Nos. 2,167,106 and 2,711,754. This invention differs in that the passages are formed in a separate manifold which in turn receives and contains the actual valve body. Moreover, communication to the valve mechanism is provided through grooves around the outside of the outer or fixed valve portion.

The manifold is adapted for use with a particular internal valve mehcanism by forming ports which extend between one or more of the longitudinal manifold passages and the internal cavity. In accordance with a preferred embodiment of the invention this is carried out by inserting a rotary milling cutter into the internal cavity, moving it axially in the cavity to the position at which a port is to be formed to communicate with a particular groove of the valve mechanism, then moving it radially outwardly along the desired line to intersect a particular passage at that desired longitudinal position.

The port resulting from such a milled slot is unique in that it is crescent shaped; moreover, it has a small axial dimension and thus minimizes the longitudinal dimension of the valve, but by reason of its peripheral length can nonetheless carry the requisite flow.

The manifold is mountable to a standardized base with sealed connections between the endwise openings of the manifold passages and corresponding passages in the base. In a typical installation, the base is first mounted in a bank, and fluid "plumbing" to the base is installed. The manifold is then rapidly attachable to (and removable from) the base, as by mounting screws, for installation and replacement, there ordinarily being no base couplings directly to the manifold.

It is an important aspect of a preferred form of the invention that the valve mechanism, or the outer portion of it, can be assembled as a "stack" of physically separate components. This outer portion may comprise a sleeve assembled from standardized ring or donut-like components that are arranged in accordance with the particular valve function. These components can be held together axially by the endwise force of the manifold closure. In contrast to U.S. Pat. No. 2,711,754, this renders unnecessary the provision of means such as threading or screws to hold the valve components together, which is an important manufacturing advantage.

This invention can best be further described and explained by reference to the accompanying drawings in which:

FIGS. 4, 5, 6, 7, and 8 are axial sections wherein each illustrates a manifold in accordance with the invention used with a different valve mechansim, specifically.

DETAILED DESCRIPTION

Figure 1:
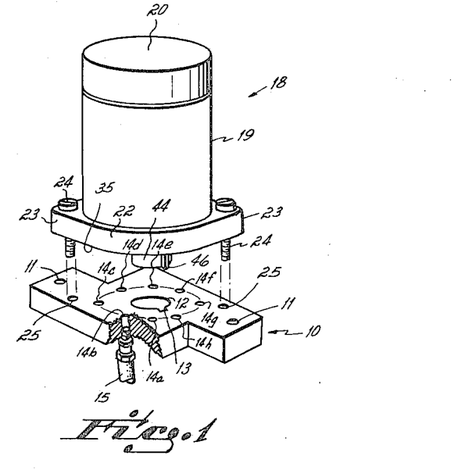
FIG. 1 is a perspective view of a preferred form of valve in accordance with the invention, and shows the manifold-base mounting structure in exploded form.
Figure 4:
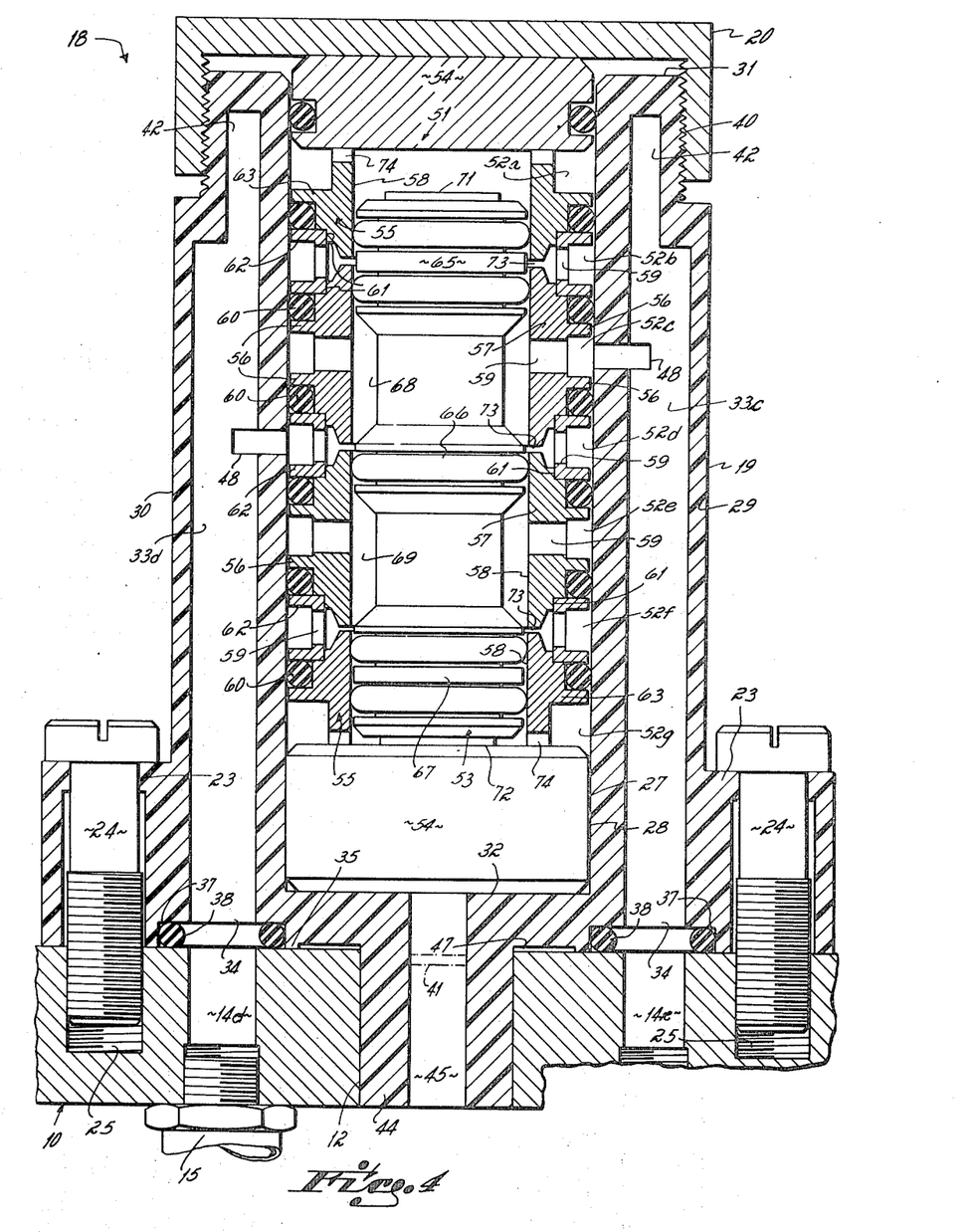
FIG. 4 shows a valve mechanism which comprises a five port, double-piloted four-way valve of the type illustrated in FIG. 2.

The overall valve assembly shown in FIGS. 1 and 4 includes a standardized mounting or base which is designated at 10. In a specific application, the base will be supported on a framework or chassis which may be spaced parallel bars (not shown). The base is mounted to its framework by screws which pass through openings 11, 11 in the base. Base 10 includes a central aperture 12 provided with an aligning keyway 13 so that the manifold to be described can be mounted to the base in a single orientation only. This insures proper alignment of the various fluid passages in the manifold with corresponding passages in the base.

Base 10 contains a plurality of openings or passages 14 which extend perpendicularly through it. These are positioned to communicate with longitudinal passages within the valve manifold when the latter is mounted to the base. In the embodiment shown, eight passages are provided in base 10, designated as $14a-14h$ respectively, arranged in circular array around the central opening 12. It will be understood that neither the number nor the arrangement of openings in the base is critical, so long as they correspond to the number and arrangement of the passages in the manifold, to be described.

Fluid lines or couplings 15, only one of which is shown in FIGS. 1 and 4, are connected to some or all of the base passages $14a-14h$. These couplings may be conventional screw fittings, and are not described in detail herein.

It should be understood that the specific base passages 14 to which fluid will be applied in any given application will depend upon the specific valve function to be performed. It is contemplated that some of the base passages may not be used in some cases; the number provided is desirably the maximum number that may be necessary for any application of the standardized base and manifold. Base ports which are not used in a given case may be plugged, as by a threaded plug, or they may be left open since the manifold itself will block contamination and loss of fluid in all passages except those which are specially ported to the internal cavity, for the specific type of valve. The fluid couplings 15 are connected to specific base passages 14 as determined for the particular installation.

The valve assembly which is mounted to base 10 is designated at 18, and includes a manifold or body 19 and a cap or closure 20 for its upper end, i.e., the end remote from that end which is secured to base 10.

Manifold 19 may include integral attachment means in the form of a flange or rim 22 having projections or ears 23, 23 on diametrically opposite sides, through which fastenings 24, 24 pass. Fastenings 24, 24 may comprise machine screws that thread into corresponding holes 25, 25 in base 10, as shown by the broken lines in FIG. 1.

Figure 2:
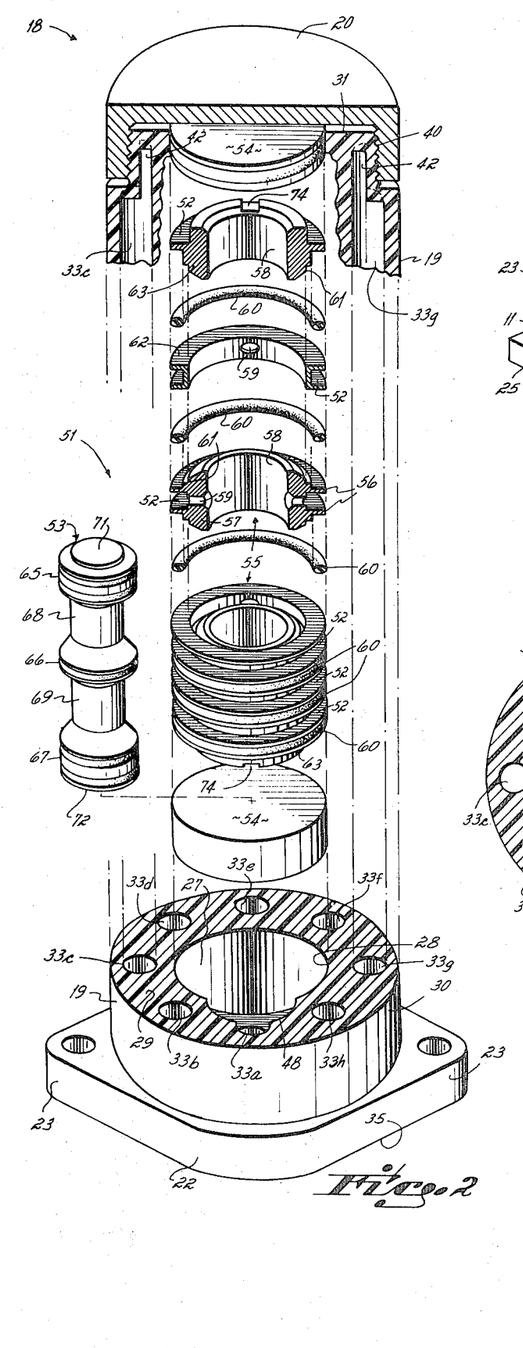
FIG. 2 is an enlarged exploded view, with some parts shown in transverse section and other parts shown in axial section of one type of four-way valve mechanism inserted in the manifold, and wherein the valve mechanism is assembled as a stack of separate components.
Figure 3:
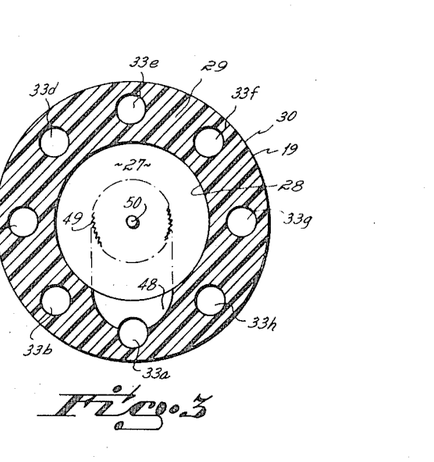
FIG. 3 is a radial section through a preferred form of manifold, showing the manner in which the manifold cavity ports can be formed with a milling cutter.

The manifold 19 is shown in axial section in FIGS. 4-8, in transverse or radial section in FIG. 3, and in cut-away view in FIG. 2. Its exterior configuration is not critical, but is desirably cylindrical, as illustrated in the preferred embodiment. Manifold 19 is hollow and has an internal cavity designated at 27, which usually but not necessarily will be cylindrical in configuration. This cavity has an annular or ring-like cross section or wall portion 29, which is defined between the surface 28 of internal cavity 27 on the inside, and the outside surface 30 of manifold 19.

As can be seen in each of FIGS. 4-8, the internal cavity 27 defined within cylindrical surface 28 extends to the upper end 31 of manifold 19, that is, the end thereof which is remote from the base mounting 22. Cavity 27 does not, however, extend entirely through the manifold, and terminates (FIG. 4) at a lower end 32, adjacent the base mounting 22.

A plurality of fluid passages, each designated as 33, extend longitudinally through the annulus 29. In the embodiment shown, these passages are arranged in circular array around the axis of cavity 27, and parallel to the axis of cavity 27. Each passage 33 extends and opens, as at 34, to the lower or base end 35 of manifold 19. The embodiment shown has eight passages 33 which are designated as 33a–33h, respectively. When the manifold is mounted to base 10, each passage will mate at its open end 34 with the corresponding base port 14a–14h, respectively.

A recess 37 is formed in the transverse lower surface 35 of manifold 19 around the opening of each passage 33, to receive and grip radially an O-ring 38 which provides a fluid seal between the respective passage 33 of the manifold and the communicating passage 14 of base 10.

As can be seen from the drawings, the passages 33 extend parallel to the axis of cavity 27, but they do not of themselves intersect or open to the inner cavity 27 or outer manifold surface 30. Unless and until a separate port, to be described, is formed between cavity surface 28 and a particular manifold passage 33, no fluid can pass between cavity 27 and any manifold passage 33.

The passages 33 preferably extend parallel to the cavity 27, over substantially its full longitudinal dimension, and terminate just inwardly of the upper end 31 of the manifold.

The external surface 30 of manifold 19 is reduced or necked down to a smaller diameter adjacent its upper end, as at 40, and is threaded externally to receive the screw-on cap 20 which provides a closure for the open end of cavity 27. Cap 20 preferably has an external diameter substantially the same as that of surface 30 so that generally uniform sidewall surface is presented. Each manifold passage 33 is of reduced diameter in that portion 42 which is within the reduced diameter portion 40 of the manifold, so that it is not intersected by the manifold's threaded outside surface. As shown in FIG. 2 in broken lines, these reduced diameter passage portions 42 may be semi-circular in section, the main length of the passages 33 being circular in section as shown in FIG. 3.

A projection or stub 44 extends axially from lower end 35 of manifold 19, and is sized to be received in the aperture 12 of base 10. Projection 44 includes an alignment key 46 receivable in base keyway 13 (see FIG. 1), so that proper orientation of the manifold with respect to the various base passages 14 is insured. In order that projection 44 may serve as an additional port if needed, it is desirable that a passageway 45 formed axially in projection 44, and further that this passageway 45 be blocked by a removable or knockout partition 41. So long as partition 41 is in place, the internal manifold cavity 27 is blocked to passage 45; if the partition 41 is removed, as by drilling or knocking it out with a punch, an axial fluid passageway to the cavity is provided, and a fluid coupling may be applied to passage 45 so that fluid may flow directly to or from cavity 27. A recess 47 is provided in base surface 35 around projection 44, in which raised passage identifying numbering may be formed.

The valve manifold 19 is conveniently (although not necessarily) formed by injection molding. It will preferably be made of plastic; suitable materials include polycarbonate resins, Nylon, Delrin, polyethylene, and Bakelite plastics. In general, however, any material may be used which will withstand the pressures and fluids encountered in the particular application. Cavity 27 may be reamed to provide a precise concentric aperture into which the valve mechanism may be slid through the open upper end 31 of manifold 19.

Communication between one or more of the passages 33a-h of a manifold and the cavity 27 are provided by radial or transverse ports 48 formed in the cavity wall to the respective passages. These ports can be formed in various ways, including melting, piercing or drilling through annulus 29 from the cavity surface 28 to a passage 33, or from the outside surface 30 to inside surface 28 along a line intersecting the particular passage 33 which it is desired to port and then plugging the exterior opening between the passage 33 and outer surface 30. However, an especially useful aspect of the invention is the forming of crescent-shaped slots by the method illustrated in FIG. 3. For this purpose, a rotary cutter which may be a milling cutter as designated at 49 in FIG. 3, rotating at the end of an elongated shaft 50, is introduced into cavity 27 through the open end of the manifold, then moved longitudinally to the axial location at which the port is to be provided and then moved radially outwardly so as to cut into surface 28 to intersect the manifold passage 33. The resulting slot or port 48 is crescent shaped (see FIG. 3), and may be relatively narrow in the direction parallel to the axis (see FIG. 4). Obtuse angles are defined where the crescent shaped slot meets the cavity.

It is an important aspect of the invention that a wide range of different internal valve mechanisms can be accepted by the modular manifold 19. The manifold is adapted for use with a particular valve mechanism by cutting radial ports 48 in the manifold at longitudinal locations appropriate for the particular valve mechanism. In the drawings, several different types of valve mechanisms are illustrated with manifolds, in accordance with the invention, and it will be apparent from this description that still other types of valve mechanisms, configured in accordance with this invention, can be used for different specific valve functions.

Whatever specific function it is to perform, the valve mechanism 51 is shaped to conform to the sectional configuration of cavity 27, and is sized to be slidably inserted into the cavity through the open end 31 thereof. The cap 20 holds the mechanism 51 in the cavity. The valve mechanism presents a plurality of peripheral grooves around its external surface, each designated at 52 in FIGS. 2 and 4, and these grooves are closed by manifold cavity surface 28. The axial positions of the respective grooves 52 determine the axial locations at which the radial manifold ports 48 are cut.

The valve member which presents the grooves for direct communication with manifold cavity ports 48 will usually be immobile in the cavity; that is, it will not usually slide in operation as a spool or poppet. However, it is contemplated that where manifold wear is not detrimental, the valve member which is inserted into the cavity may slide or shift over surface 28 in operation.

The valve mechanism may include one or more internal movable elements, as for example a spool as designated at 53 in FIG. 2, which slides within a fixed sleeve or outer portion 55 that presents the grooves 52 on its outer surface.

The manifold is not limited to use only with valve mechanisms of the same length as the cavity axial dimension; where the valve mechanism is shorter than the overall longitudinal dimension of cavity 27, effective cavity length may be reduced by insertion of one or more plugs, spacers or inserts 54 (see FIGS. 4 and 5), against which the valve mechanism is pressed by the cap 20.

It is a further advantage of the invention that fixed outer portion or sleeve 55 of the valve mechanism 51 need not be an integral or unitary piece. I have found that it can advantageously be formed as a stack of elemental components that are held together by the axial force of cap 20, without other securing. These components can be inserted or stacked one at a time into cavity 27, so that valve sleeve 55 is in effect assembled right in the manifold. This is illustrated in FIGS. 2 and 4 for one type of valve, and each of FIGS. 5-8 show other types of valve outer portions built as a stack of components in accordance with this aspect of the invention. The components used can themselves be standardized or modular, so that an individual component can be used as a building block in the assembly of several different types of valve mechanisms, for installation in manifolds.

The specific valve mechanism 51 which is shown in FIGS. 2 and 4 is a double-piloted four-way valve. It has five main ports and two pilot ports. Seven passages, designated 33a-g, of the eight manifold passages are used to provide fluid communication to these valve ports. One passage, 33b, is not used in this particular application, and is not ported to the cavity.

The four-way valve mechanism or insert includes a generally cylindrical sleeve or outer portion 55 having a maximum outside diameter substantially equal to that of cavity 27, and having an axial internal chamber 58 which is sized to accommodate a movable spool 53.

As best shown in FIG. 2, the sleeve 55 is assembled as a stack of components of three different shapes. The different components used in the assembly of this particular valve are designated at 57, 62 and 63. Each is annular in shape, and centers and locates an adjacent component. They are stacked axially in the order 63, 62, 57, 62, 57, 62, 63, with O-ring seals between them, and together define the outer or sleeve valve component 55.

The component 57 has a groove 52 formed around its external periphery, and this groove is ported radially to the internal chamber surface 58 through radial ports 59. On each side of groove 52, the component 57 has a land or rim 56 which receives an O-ring 60, see FIG. 4, that seals with the next adjacent component. The component 62 is an annulus having a peripheral groove 52 formed in it which is ported to the inside surface of the annulus through radial ports 59. The ring 62 spaces one component 57 axially from a second component 57, in the form of an annular gap so that a flow path 73 is provided between them through which flow can pass between the radial port 59 and the interior bore or surface 58 of this outer portion of the valve mechanism.

The components 63 are stacked at the axial ends of the sleeve 55. Each component 63 has an external flange or surface for receiving an O-ring 60 for providing the seal between component 63 and the ring component 62 which is stacked next to it. The opposite surface of the flange on component 63 cooperates with end plug 54 to define another groove 52.

The inner surfaces 58 of annular sleeve components 57 and 63 are of uniform diameter, while annulus 62 has a larger inside diameter and is received and located on the annular shoulders 61 adjacent the ends of components 57 and 63. Thus, when stacked the annulus 62 not only provides an outer groove but also acts as a concentricity maintaining centering devices, and as a spacer so that the annular gap 73 is provided between the components 57 and 62 (see FIG. 4).

The particular spool 53 used in the four-way valve insert shown in FIGS. 2 and 4 has lands 65, 66, 67 separated by grooves 68 and 69, and is slidable axially over sleeve bore surface 58 in response to a pressure differential between its upper and lower end surfaces 71 and 72. Each sleeve end component 63 is radially ported, as at 74, to provide communication from the external groove 52 thereof, to the internal chamber in which the end surface 71 or 72 resides.

Each of the seven external grooves 52 of the four-way valve sleeve communicates by a radial port similar to that shown at 48 in FIG. 3, with a specific passage 33 of the manifold. For convenience, these seven grooves will be referred to as 52a through 52g and will be understood to communicate with corresponding manifold passages 33a–33g respectively.

It will be seen that the length of the valve mechanism 51 of FIGS. 2 and 4 is somewhat less than the overall axial dimension of cavity 27, and for that reason end plugs 54, 54 are used. These are sized so that when the cap 20 is screwed on, the sleeve components 57, 62 and 63 are held in tightly stacked relationship and cannot move relative to one another. The end plugs also limit the axial movement of spool 53.

The spool 53 is movable downwardly in the sleeve chamber by pilot pressure applied through manifold passage 33a and groove 52a, which urges it to the position shown in FIG. 4 when opposite end groove 52g is vented via passage 33g. The spool is movable upwardly by pressure applied through passage 33g and groove 52g when groove 52a is vented. In the spool down position shown in FIG. 4, pressure fluid from passage 33c flowing through groove 52c is directed by spool groove 68 to port 73, sleeve groove 52d and manifold passage 33d. Fluid from passage 33e via sleeve groove 52e is directed by spool groove 69 to sleeve groove 52f and passage 33f. Venting the pilot pressure on surface 71 and applying pilot pressure through passage 33g and groove 52g shifts the spool upwardly, and connects groove 52c with groove 52b, and also connects groove 52e with groove 52d.

Figure 5:
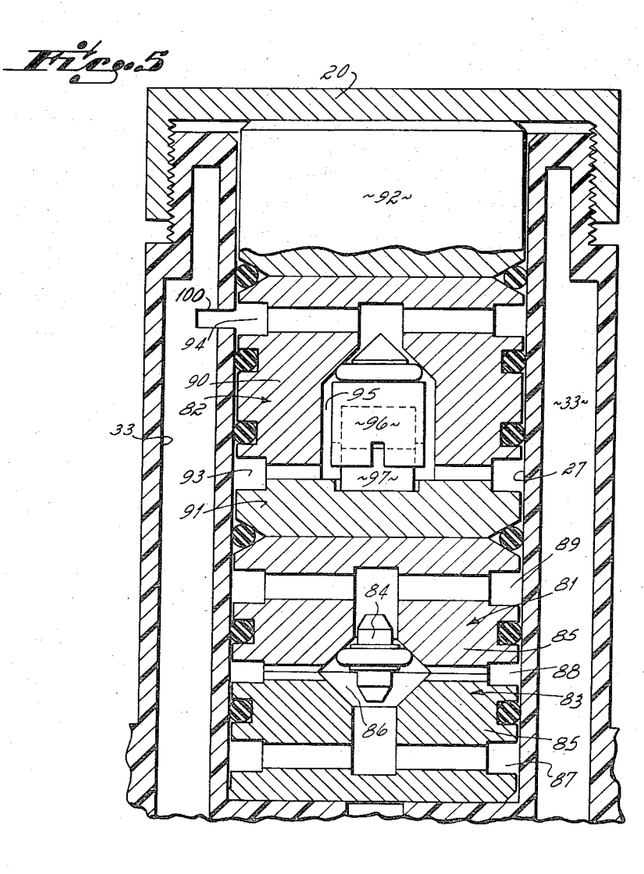
FIG. 5 shows a manifold housing two separate valve mechanisms, one being a shuttle valve and the other being a check valve.

FIG. 5 illustrates use of the manifold to house two separate valve mechanism, a shuttle valve 81 and a check valve 82. Shuttle valve 81 includes an outer or body portion designated generally by 83, and movable inner element or shuttle 84 which is housed in body 83. Body portion 83 is comprised of two identically formed components 85, 85 which are stacked in reverse end-to-end relation as shown in FIG. 5, and which define the shuttle chamber 86 between them. Like the first described valve mechanism, the outer portion 85 of shuttle valve 83 has external grooves defined around it, designated at 87, 88 and 89. Each groove is connected through a separate transverse manifold port (not shown in FIG. 5) with a different one of the manifold passages 33. Grooves 87 and 89 communicate with opposite ends of the shuttle chamber 86 and groove 88 communicates with the center of the shuttle chamber.

The function of shuttle valve 81 is to connect whichever of the grooves 87 or 89 is at the higher pressure, with port 88, which functions as an outlet port. The higher pressure will shift the shuttle 84 in a direction closing the lower pressure side.

The check valve mechanism 82 is comprised of two separate, axially stacked, fixed outer body components 90 and 91. Component 91 abuts the upper component 85 of the pilot valve, and the second check valve component 90 abuts a manifold end plug 92. Relative movement of any of the shuttle or check valve body components is prevented by the cap 20 which (together with the opposite end of the manifold) hold them in compression.

Similarly to the other valve mechanisms, the outer components of the check valve mechanism present external grooves 93 and 94. These communicate with opposite ends of an internal check valve chamber 95, and each is separately ported thru the manifold wall to a different passage 33; one such port is designated at 100. A movable check valve component 96 is disposed in chamber 95, and is guided in axial sliding movement therein on a projection 97 which extends perpendicularly from the upper surface of fixed component 91.

When the pressure acting in groove 93 (applied thereto through a manifold port not shown) is greater than that in groove 94, the pressure acting on the lower end of the movable check valve element 96 holds the valve closed in the position shown in FIG. 5. When the higher pressure is in groove 94, the check valve is open and fluid flows from the manifold passage through port 48, groove 94, check valve chamber 95 to groove 93 and outwardly through another manifold passage.

Although the two valve mechanisms 81 and 82 are stacked in end-to-end relation in a common manifold, it should be understood that there need be (and in the embodiment shown, there is no) functional connection between them. Thus, a single manifold is able to do double duty where the axial dimension of the cavity is sufficient to receive the multiple separate valve mechanisms. Fluid flows to and from each mechanism through separate manifold passages.

Figure 6:
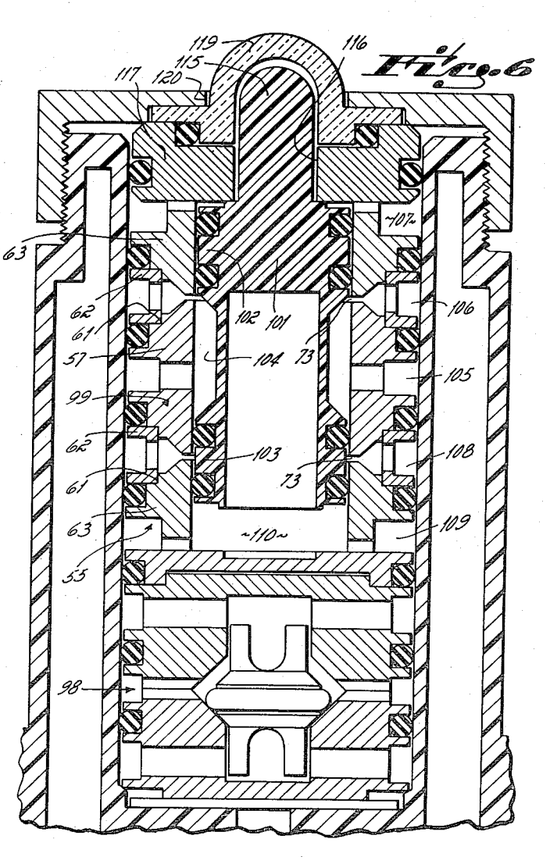
FIG. 6 shows a manifold housing a shuttle valve and a double piloted, three-way valve, with a visual mode indicator at one end of the spool.

FIG. 6 illustrates another type of valve mechanism and manifold in accordance with the invention, this being a combined shuttle valve and double piloted three-way valve with a spool position indicator. The shuttle valve 98 is housed in the same manifold with the three-way valve 99; but as is the case with respect to the combined valve mechanism of FIG. 5, the shuttle and three-way may not functionally interact, the same manifold being used merely to provide housing and fluid communication for each. The functional and structural similarity of the shuttle valve 98 shown in FIG. 6, to the shuttle valve 83 of FIG. 5, will be apparent from comparison of the two drawings.

The three-way valve 99 is comprised of a stack of three fixed outer or body components which may be recognized as being the same as the components 57, 62 and 63 which form the four-way valve of FIGS. 2 and 4. With reference to FIG. 6, the outer body portion is a sleeve which is comprised of a stack of these components in the order 63, 62, 57, 62 and 63, with O-rings disposed on either side of the groove components 62 to provide seals. The shoulders 61 on the components 57 and 63 center the groove component 62, and the latter component spaces the components 57 and 63 apart from one another axially so that the annular gap or passage 73 is defined between them.

The movable internal spool 101 of the three-way valve shown in FIG. 6 includes opposed ends lands 102 and 103 that are separated by a central groove 104. When pilot pressure is applied into the chamber 110 at the lower end of spool 101, and the pressure at the upper end of the spool is vented, that pressure holds the spool upward in a first position as shown in FIG. 6, and fluid flowing from sleeve groove 105 is directed upwardly by spool groove 104 to sleeve groove 106. When the pressure in chamber 105 is released and pressure is applied to the upper end of the spool through groove 107 and the sleeve port associated with it, that pressure moves the spool downward to a second position such that fluid from body groove 105 is directed by spool groove 104 to port 108. The radial ports between the respective body grooves 105, 106, 107, 108 and 109 to corresponding different manifold passages 33 are not shown in FIG. 6 but may be similar to those previously described.

It will be noticed that the spool 101 has an extension or projection 115 at the upper end thereof. This extension passes freely through aperture 116 in the end plug 117 and extends into a clear transparent doomed window 119. Window 119 may be molded of a clear plastic or glass; the spool is preferably made of colored or white plastic or other material such that its extension 115 will be visible through the window 119 when the spool is in the upward position shown, but not visible when the spool is in the lowered position. Window 119 extends through and is sealed to an opening 120 in the cap 122. The visibility of nonappearance of spool extension 115 in the window 119 can be taken as an indication not only of the spool position, but of the condition or status of the equipment served by the valve 99, for example the position of a ram.

It will be apparent that three separate manifold passages are required to supply check valve 98, and five additional manifold passages are required to serve the three-way valve. Together, therefore, all eight ports of the manifold are utilized to serve one or the other of the valve mechanisms.

Figure 7:
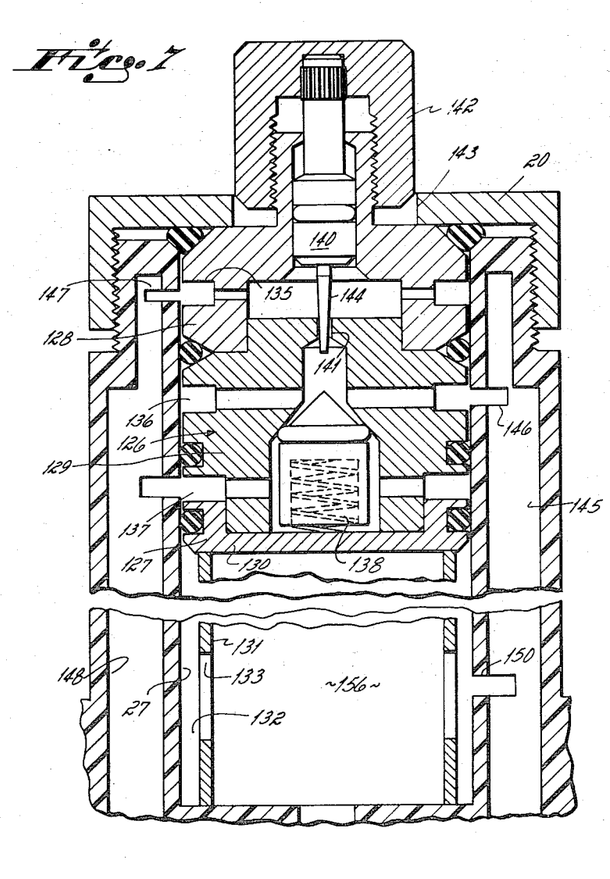
FIG. 7 is a time delay three-way valve with a needle valve adjustor.

FIG. 7 illustrates the invention in conjunction with a time delay flow control valve 126. As in the embodiments previously described, the valve mechanism is comprised of a fixed outer portion that slides into the manifold cavity and which is defined by a stack of components. The general similarity of certain of these components to components previously described will be apparent, the modular configurations of the components enabling them to be utilized in this valve mechanism also.

This valve structure includes an outer body portion 127, configured to be fitted into the internal chamber 27 of the manifold when the cap has been removed therefrom. The body portion 127 is defined by a stack of components designated at 128, 129, 130 and 131. Component 131 is a tubular volume chamber and spaces the other components well above the bottom of cavity 27. Ports 133 communicate through the wall of component 131 so that no differential can exist across its wall.

Grooves 135, 136 and 137 are defined around body portion 127. Groove 137 communicates through a radial port to the underside of a movable check valve element 138 which is spring biased upwardly toward the closed position shown in FIG. 7. Groove 136 communicates radially with a chamber on the upstream side of the check valve, so that pressure in groove 136 tends to move the check valve to open position.

An adjustable needle valve designated generally at 140 provides a variable restriction in an axial port 141 in body member 129. The upper or inlet side of port 141 communicates through a radial port with groove 135, and its lower side communicates directly with the upstream side of the check valve member 138. Needle valve 140 is operated by an adjusting dial or knob 142, which extends from an opening 143 in cap 20. Knob 142 is connected to the needle valve such that turning knob 142 in one direction extends needle 144 toward port 141, and thereby increasingly restricts the flow through that passage.

One manifold passage 145 is connected via a port 146, to groove 136; another passage 148 is connected through a port 147 at a different axial location to groove 135. The same manifold passage 148 is also ported at a different axial location by a port 149, to groove 137.

The valve mechanism shown in FIG. 7 permits free flow in the direction from passage 145, port 146, groove 136, past check valve 138, to groove 137, port 149, and passage 148. The valve restricts flow in the opposite direction, i.e. flow from passage 148 to passage 145. This fluid acts through groove 137 on the lower side of check valve 138 and, together with the spring, holds the check valve in closed position. The same pressure is also applied through port 141 and groove 135 and is bled slowly past needle valve 141, 144 to groove 136, port 146 and passage 145. Manifold passage 145 is also connected by a port 150 into volume chamber 156. Fluid bleeding off past needle valve 141, 144, builds up pressure slowly in chamber 156, and this delayed pressure build up is useful to slow down or retard the operation of a member operated by the pressure in manifold passage 145.

Figure 8:
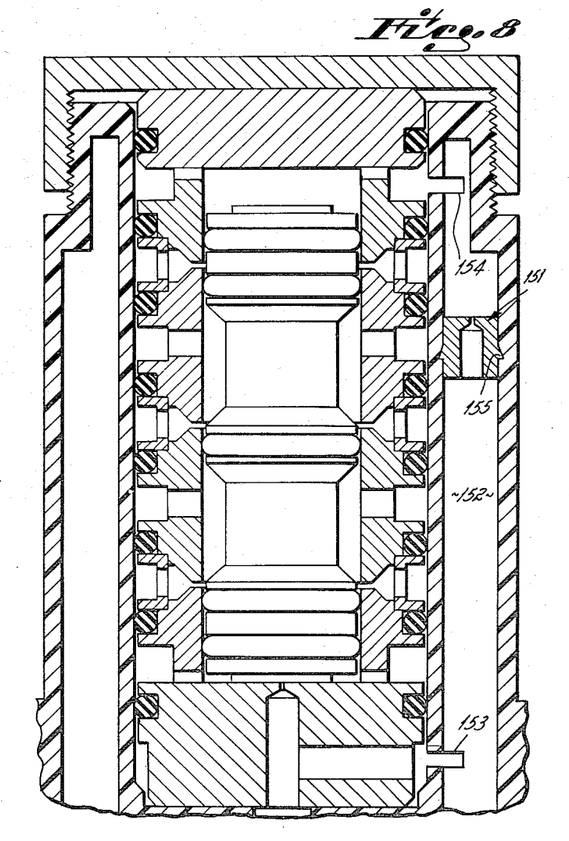
FIG. 8 is a four-way valve in which one manifold passage is ported twice, at different longitudinal positions, with a restrictor in the passage between the two ports.

FIG. 8 illustrates still another embodiment of the invention, this being a four-way bleed valve which includes a modular manifold passage flow restrictor. A restrictor 151 is inserted in the manifold passage 152, to restrict flow of fluid between two radial ports 153 and 154 which connect with that passage at different longitudinal points thereon. The restrictor 151 is formed as a cylindrical component, having an outside diameter nominally the same as that of passage 152, but it has projecting barbs 155 which resist or impede its movement in the passage. The restrictor is positioned in the passage by pushing it longitudinally to the desired position between the ports 153 and 154. The pressure acting across this restrictor is insufficient to cause dislodging or actual movement of the restrictor within the passage. As will be apparent, the restrictor establishes a pressure differential in response to flow of fluid across it, so that the pressure in port 153 may be different (either higher or lower) than the pressure in port 154, depending upon the direction of flow.

Figure 9:
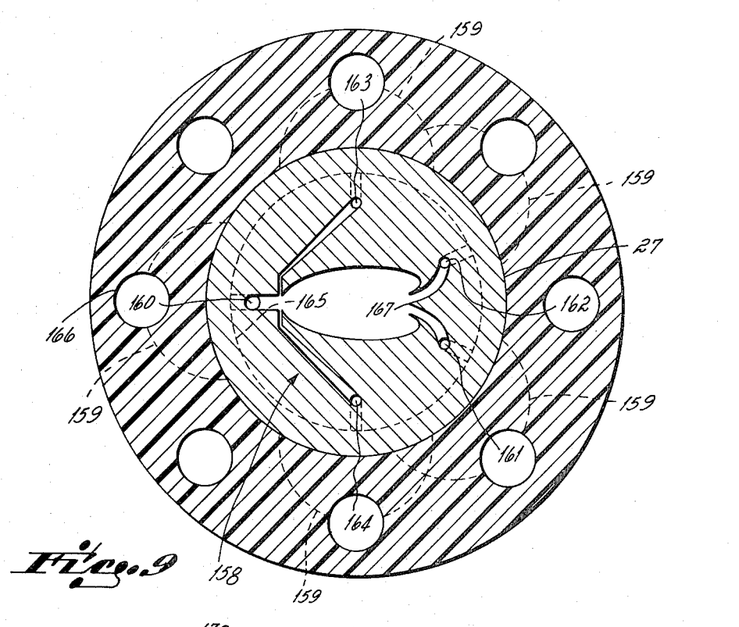
FIG. 9 is a radial section showing a manifold used to house and port a valve mechanism without moving parts, the mechanism being a fluidic amplifier.

Each of the valve embodiments shown in FIGS. 2 and 4-8 has included moving valve parts, but it will be seen that there is no movement in operation between the outer valve components and the manifold wall. The invention can also be used to manifold or provide fluid passages to fluidic amplifier or other valves, which have no moving parts. One example of such use of manifold is shown in FIG. 9. A fluidic amplifier valve component 158, in the shape of a cylindrical plug, is inserted within the manifold bore 27. This disc 158 contains five passages 160–164 which extend parallel to the axis thereof, and each such passage communicates with a separate, axially spaced groove around the outside of the plug, one of which is indicated by the dotted lines at 165. These grooves are ported to different manifold passages, as indicated by the dotted lines at 159. When fluid is introduced through manifold passage 166, and the communicating groove to bore 160, it impinges as a jet on the pointed divider 167 between two conduits that communicate respectively with vertical passages 161 and 162. Application of fluid pressure through either of two other opposed control passages 163 or 164 will direct the jet from passage 160, toward one of the ports 161, 162 and away from the other, and thereby will establish a differential between those ports. A relatively slight change of pressure between fluids in passages 163 and 164 controls the flow of a relatively large volume of fluid between ports 161 and 162.

Figure 10:
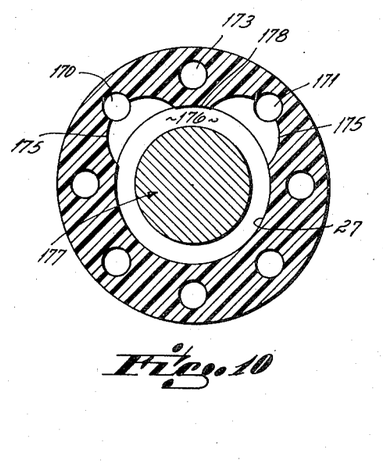
FIG. 10 is a radial section of a manifold showing two manifold passages cross connected through a groove in the outer portion of the valve mechanism.

FIG. 10 of the drawings illustrates a preferred manner in which two different passages 170 and 171 in a manifold may be cross connected, to provide fluid communication directly between them. It is desirable (although not critical) that the passages which are to be cross connected be selected so as not to be adjacent, that is, to be separated by at least one intermediate wall portion which may surround a passage 173. Each of the passages 170 and 171 is ported radially as at 175 to the chamber 27, at the same longitudinal (axial) position. These ports 175, 175 are cross connected by a groove 176 in an internal valve member designated generally at 177. I have found that the rib or web 178 between the two ports 175, 175 desirably provides a guide surface which helps to prevent an O-ring 60 on the valve body portion from "hanging up" or becoming jammed in either of the ports 175 when the valve mechanism is inserted. If two adjacent passages are connected and their associated radial ports intersect so that a single, longer port results, it tends to resist easy passage of an O-ring past it.

Figure 11:
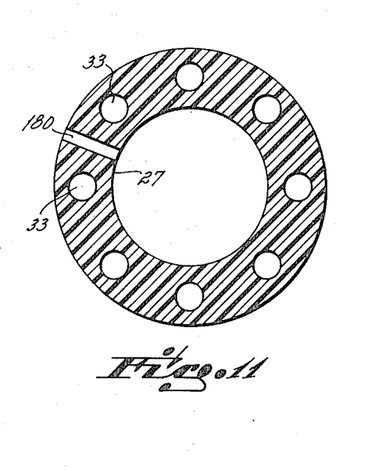
FIG. 11 is a cross-section of a manifold wherein additional porting in the form of a radial vent port is provided between adjacent longitudinal passages.

In the valve assemblies described above, all fluid connections to the valve mechanisms have been provided through the longitudinal passages in the manifold. In some cases, for example, where two or more separate valve mechanisms are mounted in a single manifold, the standard number of manifold passages may be insufficient to serve all of the necessary valve grooves. In this circumstance, it will often be the case that one or more of the valve grooves will simply be a vent port which does not require base conduit connection to it. One or more additional ports can then be provided by drilling a radial port through the manifold from the outside surface to the internal cavity 27 thereof, at the appropriate longitudinal position, as shown at 180 in FIG. 11. Note that the port 180 is formed in an angular position between adjacent manifold passages 33, such that it does not intersect any passage 33. This manner of forming "additional" porting in the manifold is especially useful where external piping to that port is necessary. It should at the same time be understood, however, that it is in many cases an advantage to provide the vent port through the base rather than the sidewall since restrictors, needle valves, etc. can conveniently be attached there, without affect valve-to-valve mounting clearance in a bank. If valve assemblies are mounted in a bank in close proximity to one another piping or fittings projecting radially from a manifold sidewall are extremely inconvenient and inaccessible.

From the foregoing description those skilled in the art will appreciate that the invention has a wide range of utility, and makes possible the provision of a wide range of different valve types, from standardized manifold and valve component parts.

While I have described herein a preferred embodiment of my invention, it is my intent to be limited only in accordance with the scope of the claims which follow:

1. Structure comprising,
 a modular fluid supply manifold comprising a hollow body closed at one end and having a wall portion surrounding an internal cavity,
 a plurality of fluid passages within said wall portion and extending parallel to the cavity for substantially the length of the cavity, said passages extending to and opening through the closed end of said body at separate positions thereon for connection to external conduits,
 a series of valve mechanisms each usable with said manifold to valve the flow of fluid that passes through said passages,
 each said mechanism having an outer portion with a sectional configuration corresponding to that of the cavity so that said mechanism is insertable into and removable from said cavity through the open end thereof,
 the outer portion of each mechanism of the series having a plurality of longitudinally spaced peripheral grooves around the outer surface thereof for the flow of fluid into and out of the mechanism,
 said manifold adapted to be ported for use with a particular one of said series by forming an opening between particular passages and grooves of the mechanism, at longitudinal positions along said passages corresponding to the position of the grooves,
 and a closure for the open end of said cavity and holding the outer portion of the mechanism against movement within the cavity.

2. The structure of claim 1 wherein each valve mechanism of said series comprise a stack of unattached separate modular elements each element interfitting with a shoulder on an adjacent element for radial alignment with respect thereto.

3. A valve assembly comprising,
 a fluid supply manifold comprising a body having a wall portion surrounding an internal cavity, said cavity opening to a first end of said manifold,
 a plurality of fluid passages within said wall portion and extending parallel to the longitudinal axis of said cavity substantially over the length thereof, said passages extending and opening to a second end of said manifold at separate positions thereon,
 a valve mechanism within said internal cavity in said manifold, said mechanism having an outside diameter such that it is insertable into said cavity through the open end thereof, said mechanism including a plurality of longitudinally spaced peripheral grooves around its outside surface for fluid communication between said mechanism and manifold,
 ports in the wall portion of said manifold extending between at least some of the respective passages in the manifold and the inner surface of said wall portion, each such port being in axial alignment with a groove of said valve mechanism and providing a direct flow path between the passage and groove,
 and a closure mounted to said first end of said manifold.

4. The assembly of claim 3 wherein said closure bears longitudinally on said valve mechanism and thereby prevents the latter from longitudinal movement within said cavity.

5. The assembly of claim 3 wherein said mechanism is shorter longitudinally than said cavity, and at least one spacer is positioned in said cavity in axial engagement with said mechanism and acts as a stop preventing the latter from shifting axially in said cavity.

6. The assembly of claim 3 wherein said valve mechanism is comprised of unattached separate components which are stacked axially on one another within said cavity and are held in such stacked relation by said body and cap.

7. The assembly of claim 3 wherein said grooves are formed around a valve sleeve having an internal chamber,
 and wherein a movable valve element is shiftable within the internal chamber of the sleeve to provide different flow paths between said grooves, depending upon the axial position of said movable element in said sleeve.

8. The assembly of claim 3 which further includes a modular base having fluid conduits therein in alignment and fluid communication with the respective passages in said manifold,
 attachment means mounting said manifold to said base,
 and sealing means providing fluid seals where the passages of the manifold meet the respective conduits of the base.

9. The assembly of claim 8 wherein said second end of said manifold is planar and O-rings are provided around the openings of said passages to form the sealing means.

10. The assembly of claim 8 which further includes an asymmetric member projecting axially from the said second end of said manifold,
 and said base has an axial opening which receives said member only in a predetermined angular position of said manifold with respect to the base.

11. The assembly of claim 10 wherein said member has a passage through it which is blocked by a removable plug and which, when said plug has been removed, provides an axial flow path into said cavity.

12. The assembly of claim 3 wherein two separate valve mechanisms are disposed within said cavity in end-to-end relation,
 each separate valve mechanism being served by different passages of said manifold.

13. The assembly of claim 3 wherein said mechanism includes an axially movable valve element which is movable between two positions relative to said manifold,
 said closure having a window through which the position of said movable valve element is visible.

14. The assembly of claim 3 wherein said mechanism includes an adjustable needle valve, and means for adjusting the position of said needle valve which extends through said closure, externally of said manifold.

15. A valve assembly comprising, a manifold comprising a body having a wall portion surrounding an internal cavity, a plurality of fluid passages within said wall portion, a valve mechanism within said cavity, said valve mechanism being comprised of a group of unattached components which are stacked on one another within said cavity, said group including peripherally grooved components, each such groove communicating with internal structure within said mechanism for operation thereof, ports in the wall portion of said manifold extending between the respective grooves and different passages of the manifold, at different longitudinal positions in the said cavity, and means closing the ends of said cavity and holding the stack of components against movement therein.

16. The valve assembly of claim 15 wherein said group includes components having endwise shoulders which nest with cooperating surfaces of adjacent components, and thereby center the said components with respect to one another.

* * * * *